United States Patent
Lee et al.

(10) Patent No.: US 11,128,227 B2
(45) Date of Patent: Sep. 21, 2021

(54) SECONDARY CONTROLLER APPLIED TO A SECONDARY SIDE OF A POWER CONVERTER AND OPERATION METHOD THEREOF

(71) Applicant: Leadtrend Technology Corp., Hsinchu County (TW)

(72) Inventors: Hung-Ching Lee, Hsinchu County (TW); Chung-Wei Lin, Hsinchu County (TW); Tsung-Chien Wu, Hsinchu County (TW); Bo-Yi Wu, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 64 days.

(21) Appl. No.: 16/733,188

(22) Filed: Jan. 2, 2020

(65) Prior Publication Data

US 2021/0111633 A1    Apr. 15, 2021

(30) Foreign Application Priority Data

Oct. 9, 2019 (TW) ................................ 108136487

(51) Int. Cl.
*H02M 3/335* (2006.01)
*H02M 1/08* (2006.01)

(52) U.S. Cl.
CPC ......... *H02M 3/33592* (2013.01); *H02M 1/08* (2013.01); *H02M 3/33576* (2013.01); *H02M 3/33553* (2013.01)

(58) Field of Classification Search
CPC ......... H02M 3/33592; H02M 3/33576; H02M 1/08; H02M 3/33553
See application file for complete search history.

(56) References Cited

U.S. PATENT DOCUMENTS

| | | | | |
|---|---|---|---|---|
| 3,989,995 A * | 11/1976 | Peterson | ........... | H02M 3/33553 363/19 |
| 4,499,530 A * | 2/1985 | Onda | ................... | H02M 3/3385 363/17 |
| 4,937,727 A * | 6/1990 | Leonardi | ........... | H02M 3/33523 363/97 |
| 5,726,869 A * | 3/1998 | Yamashita | ........ | H02M 3/33592 363/21.06 |
| 6,522,560 B1 * | 2/2003 | Lin | ................... | H02M 3/33507 363/89 |

(Continued)

*Primary Examiner* — Kyle J Moody
(74) *Attorney, Agent, or Firm* — Winston Hsu (57) ABSTRACT

A secondary controller applied to a secondary side of a power converter includes a control signal generation circuit. The control signal generation circuit is coupled to an output terminal of the secondary side of the power converter for detecting an output voltage of the secondary side and enabling a pulse signal to a signal source of the secondary side of the power converter, wherein the signal source enables a turning-on signal according to the pulse signal. The turning-on signal is coupled to a primary-side auxiliary winding of the power converter through a secondary-side auxiliary winding of the power converter to make the primary-side auxiliary winding generate a voltage, and a primary controller of a primary side of the power converter makes the primary side of the power converter be turned on according to the voltage.

15 Claims, 5 Drawing Sheets

(56) References Cited

U.S. PATENT DOCUMENTS

2007/0014133 A1* 1/2007 Shao ................... H02H 7/1252
363/52
2017/0346405 A1* 11/2017 Lin ....................... H02M 1/08
2020/0091826 A1* 3/2020 Yang ................ H02M 3/33523

* cited by examiner

SECONDARY CONTROLLER APPLIED TO A SECONDARY SIDE OF A POWER CONVERTER AND OPERATION METHOD THEREOF

BACKGROUND OF THE INVENTION

1. Field of the Invention

The present invention relates to a secondary controller applied to a secondary side of a power converter and an operation method thereof, and particularly to a secondary controller and an operation method thereof that can utilize a secondary-side auxiliary winding and a turning-on signal to control turning-on of the power converter when the power converter operates in a discontinuous conduction mode (DCM) and a quasi resonant mode, or in a continuous conduction mode (CCM).

2. Description of the Prior Art

In the prior art, a designer of a power converter can utilize a primary controller applied to a primary side of the power converter or a secondary controller applied to a secondary side of the power converter to control turning-on and turning-off of the power converter. The primary controller utilizes an auxiliary winding of the primary side of the power converter to detect change of an output voltage of the secondary side of the power converter to control turning-on and turning-off of the power converter. The secondary controller directly detects the change of the output voltage of the secondary side of the power converter, and transmits the change of the output voltage to the primary controller to control turning-on and turning-off of the power converter through a feedback path formed by a photo coupler and a secondary-side synchronous rectification switch. Because the primary controller indirectly detects the change of the output voltage (i.e. utilizing the auxiliary winding to detect the change of the output voltage), compared to the secondary controller, the primary controller cannot accurately control turning-on and turning-off of the power converter. However, because the secondary controller controls turning-on and turning-off of the power converter through the feedback path formed by the photo coupler and the secondary-side synchronous rectification switch, the power converter only operates in a discontinuous conduction mode (DCM). In addition, when the power converter utilizes the secondary controller to control turning-on and turning-off of the power converter, because the power converter makes the primary side of the power converter turned on needing through conduction of the secondary-side synchronous rectification switch and the photo coupler, the secondary-side synchronous rectification switch is a necessary component of the secondary side of the power converter, resulting in a structure of the power converter being limited. Therefore, all the above-mentioned solutions provided by the prior art are not good choices for the designer of the power converter.

SUMMARY OF THE INVENTION

An embodiment of the present invention provides a secondary controller applied to a secondary side of a power converter. The secondary controller includes a control signal generation circuit. The control signal generation circuit is coupled to an output terminal of the secondary side of the power converter for detecting an output voltage of the secondary side, and enables a pulse signal to a signal source of the secondary side of the power converter, wherein the signal source enables a turning-on signal according to the pulse signal. The turning-on signal is coupled to a primary-side auxiliary winding of the power converter through a secondary-side auxiliary winding of the power converter to make the primary-side auxiliary winding generate a voltage, and a primary controller of a primary side of the power converter makes the primary side of the power converter turned on according to the voltage.

Another embodiment of the present invention provides an operation method of a secondary controller applied to a secondary side of a power converter, wherein the secondary controller includes a control signal generation circuit. The operation method includes the control signal generation circuit enabling a pulse signal to a signal source of the secondary side of the power converter and disabling a short-circuited control signal when an output voltage of the secondary side of the power converter is less than an output target voltage, wherein the signal source enables a turning-on signal according to the pulse signal, the turning-on signal is coupled to a primary-side auxiliary winding of the power converter through a secondary-side auxiliary winding of the power converter to make the primary-side auxiliary winding generate a voltage, and a primary controller of a primary side of the power converter makes the primary side of the power converter turned on according to the voltage; during a turning-on period of the primary side of the power converter, when a detecting voltage of the primary side of the power converter is greater than a detecting target voltage, the primary controller turning off the primary side of the power converter; and the control signal generation circuit enabling a short-circuited control signal to at least one short winding switch after a discharge time of the secondary side of the power converter to make the at least one short winding switch turned on.

Another embodiment of the present invention provides an operation method of a secondary controller applied to a secondary side of a power converter, wherein the secondary controller includes a control signal generation circuit. The operation method includes the control signal generation circuit enabling a pulse signal to a signal source of the secondary side of the power converter when a discharge time of the secondary side of the power converter is greater than a minimum turning-off time and an output voltage of the secondary side of the power converter is less than an output target voltage, wherein the signal source enables a turning-on signal according to the pulse signal, the turning-on signal is coupled to a primary-side auxiliary winding of the power converter through a secondary-side auxiliary winding of the power converter to make the primary-side auxiliary winding generate a voltage, and a primary controller of a primary side of the power converter makes the primary side of the power converter turned on according to the voltage; and during a turning-on period of the primary side of the power converter, when a detecting voltage of the primary side of the power converter is greater than a detecting target voltage, the primary controller turns off the primary side of the power converter.

The present invention provides a secondary controller applied to a secondary side of a power converter and an operation method thereof. The secondary controller and the operation method utilize a secondary-side auxiliary winding of the power converter to couple a turning-on signal enabled by a signal source of the secondary side of the power converter to a primary-side auxiliary winding of the power converter to make a primary controller of a primary side of the power converter turn on the power converter according to voltage change of the primary-side auxiliary winding. Therefore, compared to the prior art, because the secondary controller can control turning-on of the power converter not through a feedback path formed by a photo coupler and a secondary-side synchronous rectification switch, the power converter of the present invention has lower cost and quickly dynamic response to change of an output voltage of the secondary side of the power converter. In addition, because the secondary controller can control turning-on of the power converter through the secondary-side auxiliary winding and the turning-on signal, the power converter not only can operate in a discontinuous conduction mode (or a quasi resonant mode), but can also operate in a continuous conduction mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
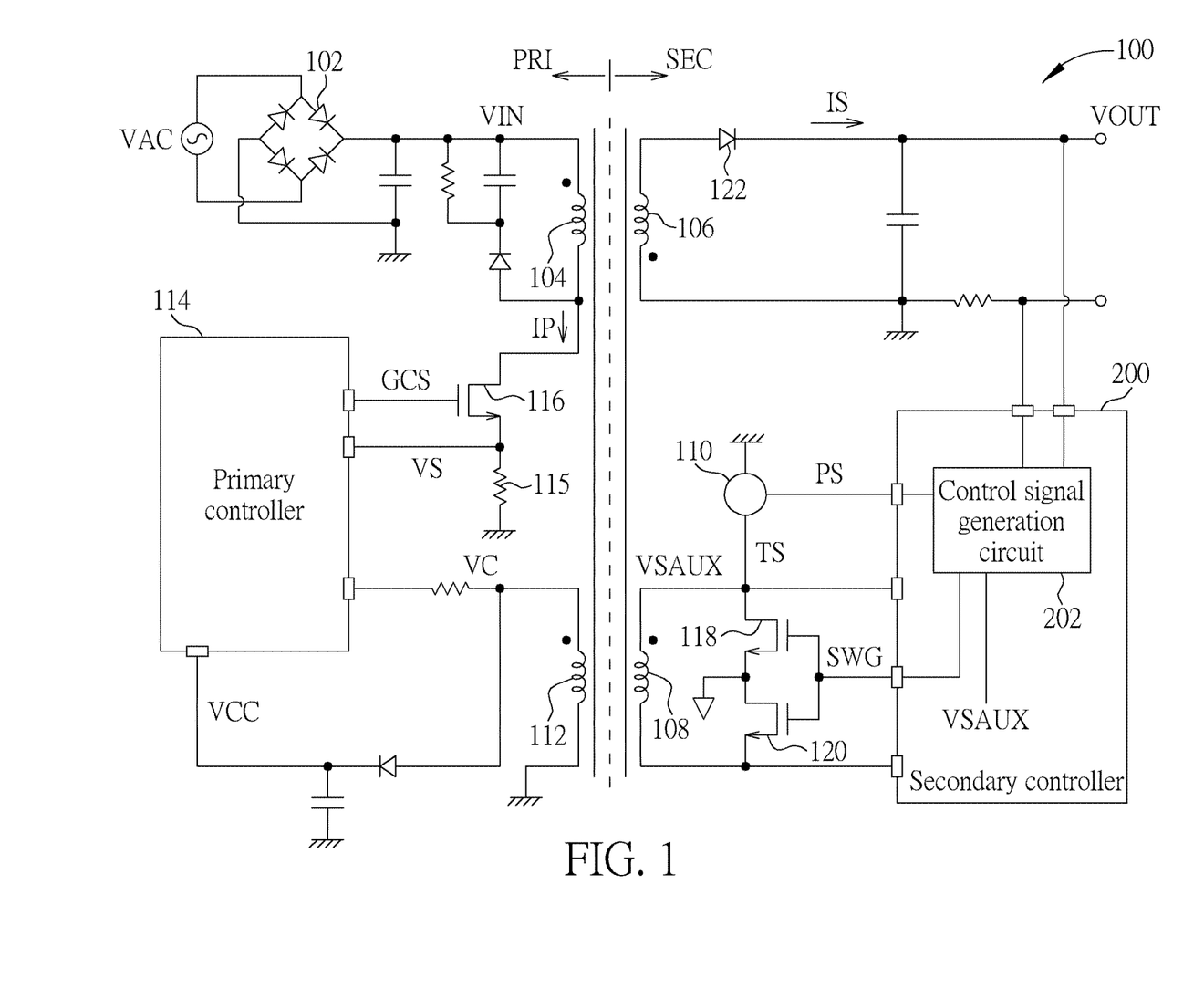
FIG. 1 is a diagram illustrating a secondary controller applied to a secondary side of a power converter according to a first embodiment of the present invention.

Please refer to FIG. 1. FIG. 1 is a diagram illustrating a secondary controller 200 applied to a secondary side SEC of a power converter 100 according to a first embodiment of the present invention, wherein the secondary controller 200 is located at the secondary side SEC of the power converter 100, and the secondary controller 200 can be applied to a discontinuous conduction mode (DCM) and a quasi resonant mode of the power converter 100, or applied to a continuous conduction mode (CCM) of the power converter 100. As shown in FIG. 1, the secondary controller 200 at least includes a control signal generation circuit 202. In addition, the power converter 100 is a flyback power converter, and potential of ground of a primary side PRI of the power converter 100 can be the same as or different from potential of ground of the secondary side SEC of the power converter 100. In addition, as shown in FIG. 1, an input voltage VIN of the primary side PRI of the power converter 100 is generated by an alternating voltage VAC being rectified by a bridge rectifier 102, and energy of the primary side PRI of the power converter 100 can be transmitted to the secondary side SEC of the power converter 100 through a primary-side winding 104 and a secondary-side winding 106 of the power converter 100.

Figure 2:
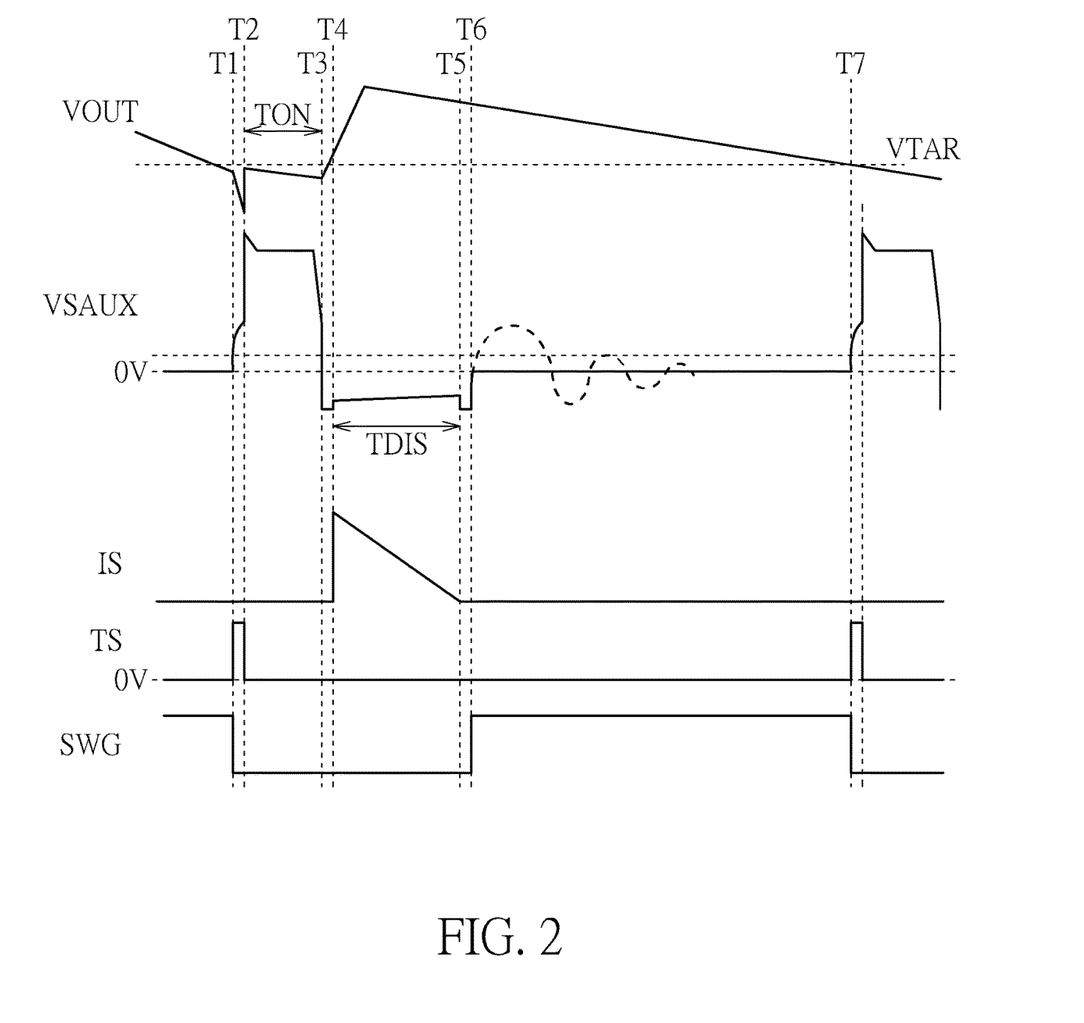
FIG. 2 is a diagram illustrating an output voltage, a secondary-side current, a turning-on signal, and a short-circuited control signal of the power converter, and a voltage of a secondary-side auxiliary winding of the secondary side when the power converter operates in the discontinuous conduction mode.

Please refer to FIG. 2. FIG. 2 is a diagram illustrating an output voltage VOUT, a secondary-side current IS, a turning-on signal TS, and a short-circuited control signal SWG of the power converter 100, and a voltage VSAUX of a secondary-side auxiliary winding 108 of the secondary side SEC when the power converter 100 operates in the discontinuous conduction mode. Next, please refer to FIGS. 1, 2. Before a time T1, the short-circuited control signal SWG is enabled by the control signal generation circuit 202 and the output voltage VOUT is greater than an output target voltage VTAR, wherein the output voltage VOUT is detected by the control signal generation circuit 202. At the time T1, because the output voltage VOUT is less than the output target voltage VTAR, the control signal generation circuit 202 can enable a pulse signal PS to a signal source 110 and disable the short-circuited control signal SWG, wherein the signal source 110 can enable the turning-on signal TS according to the pulse signal PS, and the signal source 110 can be a voltage source or a current source. During an enabling period (between the time T1 and a time T2) of the turning-on signal TS, the voltage VSAUX of the secondary-side auxiliary winding 108 of the power converter 100 can be changed with the turning-on signal TS, and the voltage VSAUX can be coupled to a primary-side auxiliary winding 112 of the power converter 100 to make the primary-side auxiliary winding 112 generate a voltage VC, wherein a primary controller 114 of the primary side PRI of the power converter 100 can enable a first gate control signal GCS to a power switch 116 of the primary side PRI of the power converter 100 according to the voltage VC to turn on the power switch 116, resulting in the primary side PRI of the power converter 100 being turned on (at the time T2). In one embodiment of the present invention, when the voltage VC is greater than a reference voltage, the primary controller 114 can generate the first gate control signal GCS to the power switch 116 accordingly, resulting in the primary side PRI of the power converter 100 being turned on. In another embodiment of the present invention, when a slope of the voltage VC is greater than a reference value, the primary controller 114 can generate the first gate control signal GCS to the power switch 116 accordingly, resulting in the primary side PRI of the power converter 100 being turned on.

In addition, please further refer to FIGS. 1, 2. At a time T3, when a detecting voltage VS of the primary side PRI of the power converter 100 is greater than a detecting target voltage, the primary controller 114 can disable the first gate control signal GCS to turn off the power switch 116, resulting in the primary side PRI of the power converter 100 being turned off, wherein the detecting voltage VS is determined by a primary-side current IP flowing through the primary side PRI of the power converter 100 and a resistor 115.

As shown in FIG. 2, after a time interval TON (i.e. a turning-on period of the power switch 116), the control signal generation circuit 202 can determine a discharge time TDIS of the secondary side SEC of the power converter 100 according to the voltage VSAUX, wherein the discharge time TDIS is between a time T4 and a time T5, and meanwhile because the primary side PRI of the power converter 100 is turned off, the secondary side SEC of the power converter 100 starts to discharge (as shown in FIG. 2, the secondary-side current IS starts to be reduced from a maximum value at the time T4). In addition, an operational principle of the control signal generation circuit 202 determining the discharge time TDIS of the secondary side SEC of the power converter 100 according to the voltage VSAUX is well-known to one of ordinary skill in the art, so further description thereof is omitted for simplicity. In addition, the control signal generation circuit 202 can enable the short-circuited control signal SWG to short winding switches 118, 120 to make the short winding switches 118, 120 turned on according to the short-circuited control signal SWG after the discharge time TDIS (i.e. a time T6) of the secondary side SEC of the power converter 100, wherein the short winding switches 118, 120 are coupled between two terminals of the secondary-side auxiliary winding 108 of the power converter 100, a predetermined time (that is, a time interval existing between the time T5 and the time T6) exists between the discharge time TDIS and the short-circuited control signal SWG, and the predetermined time can be changed with a requirement of a designer of the power converter 100. Meanwhile, because the short winding switches 118, 120 are turned on, the two terminals of the secondary-side auxiliary winding 108 will be shorted. In addition, if the short winding switches 118, 120 do not exist, the voltage VSAUX will have resonance (shown in a dashed line after the time T6) because a resonance influence exists between the primary-side winding 104 and the secondary-side auxiliary winding 108 of the power converter 100. Thus, the primary controller 114 may turn on the primary side PRI of the power converter 100 because of resonance of the voltage VSAUX. That is, the resonance of the voltage VSAUX may make the primary side PRI of the power converter 100 and the secondary side SEC of the power converter 100 simultaneously turned on. Therefore, as shown in FIG. 2, after the short winding switches 118, 120 are turned on, the voltage VSAUX will not have resonance to ensure that the primary controller 114 does not turn on the primary side PRI of the power converter 100. In addition, the present invention is not limited to the power converter 100 including the short winding switches 118, 120, that is, the power converter 100 can include at least one short winding switch.

In addition, in another embodiment of the present invention, the power converter 100 utilizes a synchronous rectification switch to substitute for a diode 122 of the secondary side SEC of the power converter 100, wherein the synchronous rectification switch is installed at the ground of the secondary side SEC of the power converter 100. Meanwhile, the control signal generation circuit 202 can control turning-on and turning-off of the synchronous rectification switch according to the voltage VSAUX. As shown in FIG. 2, the control signal generation circuit 202 can generate a second gate control signal to the synchronous rectification switch according to the voltage VSAUX between the time T4 and the time T5, wherein the synchronous rectification switch can be turned on according to the second gate control signal, resulting in the secondary side SEC of the power converter 100 being turned on. In addition, an enabling period of the second gate control signal corresponds to the discharge time TDIS of the secondary side SEC of the power converter 100.

As shown in FIG. 2, at a time T7, because the output voltage VOUT is less than the output target voltage VTAR again, the control signal generation circuit 202 can enable the pulse signal PS to the signal source 110 again. In addition, after the time T7, operational principles of the power converter 100, the primary controller 114, and the secondary controller 200 can be referred to the above-mentioned operational principles of the power converter 100, the primary controller 114, and the secondary controller 200 between the time T1 and the time T6, so further description thereof is omitted for simplicity. In addition, during a turning-on period of the primary side PRI of the power converter 100, the primary-side auxiliary winding 112 can also receive energy of the primary side PRI of the power converter 100 to generate an operation voltage VCC of the primary controller 114 by coupling the primary-side winding 104.

Therefore, as shown in FIG. 1, the secondary controller 200 can accurately implement turning-on of the power converter 100 controlled by the secondary side SEC of the power converter 100 through the secondary-side auxiliary winding 108 and the turning-on signal TS. That is, the secondary controller 200 can implement turning-on of the power converter 100 controlled by the secondary side SEC of the power converter 100 not necessarily through a feedback path of the prior art formed by a photo coupler and a secondary-side synchronous rectification switch of the secondary side SEC of the power converter 100. In addition, because the secondary controller 200 can control turning-on of the power converter 100 by the secondary side SEC of the power converter 100 through the secondary-side auxiliary winding 108 and the turning-on signal TS, the power converter not only can operate in the discontinuous conduction mode (or the quasi resonant mode), but can also operate in the continuous conduction mode.

Figure 3:
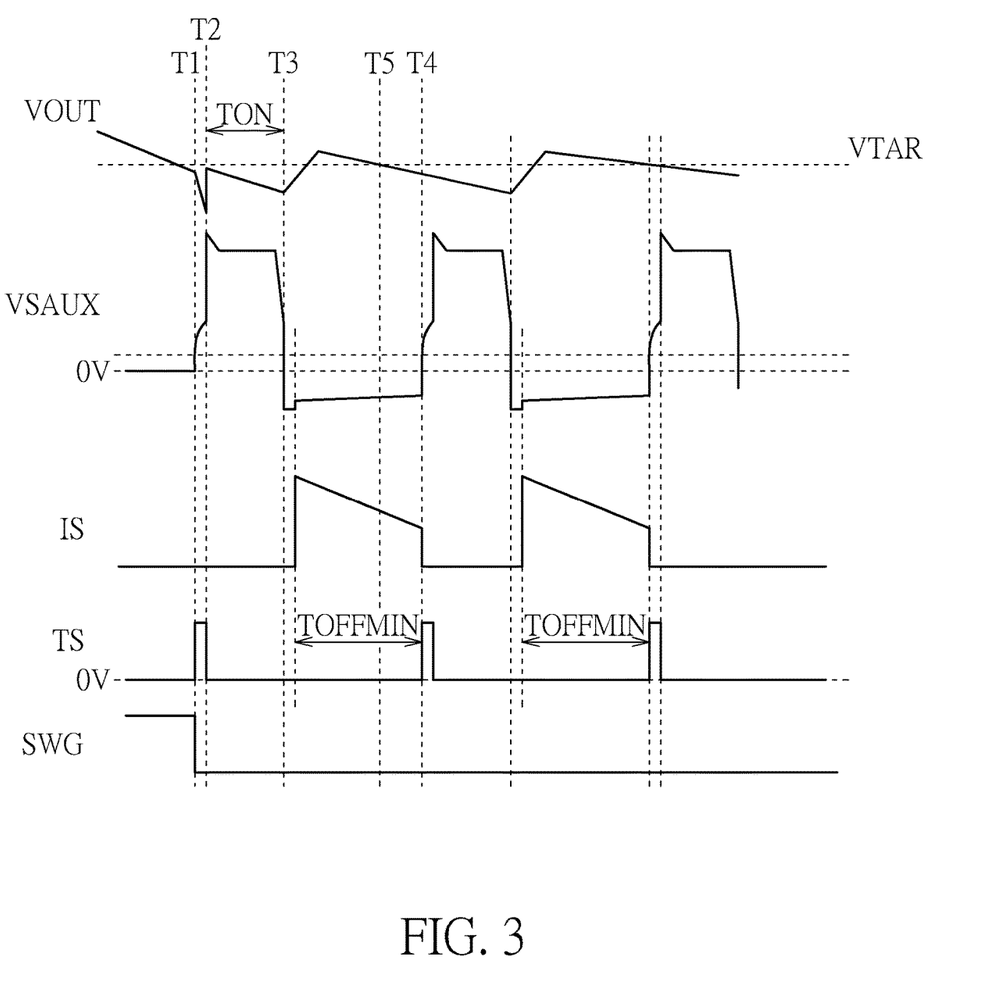
FIG. 3 is a diagram illustrating the output voltage, the secondary-side current, the turning-on signal, the short-circuited control signal, and the voltage when the power converter operates in the continuous conduction mode.

Please refer to FIG. 3. FIG. 3 is a diagram illustrating the output voltage VOUT, the secondary-side current IS, the turning-on signal TS, the short-circuited control signal SWG, and the voltage VSAUX when the power converter 100 operates in the continuous conduction mode. Next, please refer to FIGS. 1, 3. Before a time T1, the short-circuited control signal SWG is enabled by the control signal generation circuit 202 and the output voltage VOUT is greater than the output target voltage VTAR. At the time T1, because the output voltage VOUT is less than the output target voltage VTAR, the control signal generation circuit 202 can enable the pulse signal PS to the signal source 110, wherein the signal source 110 can enable the turning-on signal TS according to the pulse signal PS. In addition, at the time T1, because the output voltage VOUT is less than the output target voltage VTAR, the control signal generation circuit 202 can further disable the short-circuited control signal SWG. During an enabling period (between the time T1 and a time T2) of the turning-on signal TS, the voltage VSAUX of the secondary-side auxiliary winding 108 of the power converter 100 can be changed with the turning-on signal TS, and the voltage VSAUX can be coupled to the primary-side auxiliary winding 112 of the power converter 100 to make the primary-side auxiliary winding 112 generate the voltage VC, wherein the primary controller 114 of the primary side PRI of the power converter 100 can enable the first gate control signal GCS to the power switch 116 of the primary side PRI of the power converter 100 according to the voltage VC to turn on the power switch 116, resulting in the primary side PRI of the power converter 100 being turned on (at the time T2).

In addition, please further refer to FIGS. 1, 3. At a time T3, when the detecting voltage VS of the primary side PRI of the power converter 100 is greater than the detecting target voltage, the primary controller 114 can disable the first gate control signal GCS to turn off the power switch 116, resulting in the primary side PRI of the power converter 100 being turned off. As shown in FIG. 3, after the time interval TON (i.e. the turning-on period of the power switch 116), the control signal generation circuit 202 can enable the turning-on signal TS at a time T4 according to a minimum turning-off time TOFFMIN, wherein because the power converter 100 operates in the continuous conduction mode, the secondary-side current IS is not reduced to zero at the time T4, and the minimum turning-off time TOFFMIN corresponds to a maximum operating frequency of the power converter 100. In addition, as shown in FIG. 3, before the control signal generation circuit 202 enables the turning-on signal TS at the time T4, the output voltage VOUT starts to be less than the output target voltage VTAR at a time T5. In addition, as shown in FIG. 3, after the time T4, operational principles of the power converter 100, the primary controller 114, and the secondary controller 200 can be referred to the above-mentioned operational principles of the power converter 100, the primary controller 114, and the secondary controller 200 between the time T1 and the time T4, so further description thereof is omitted for simplicity.

Figure 4:
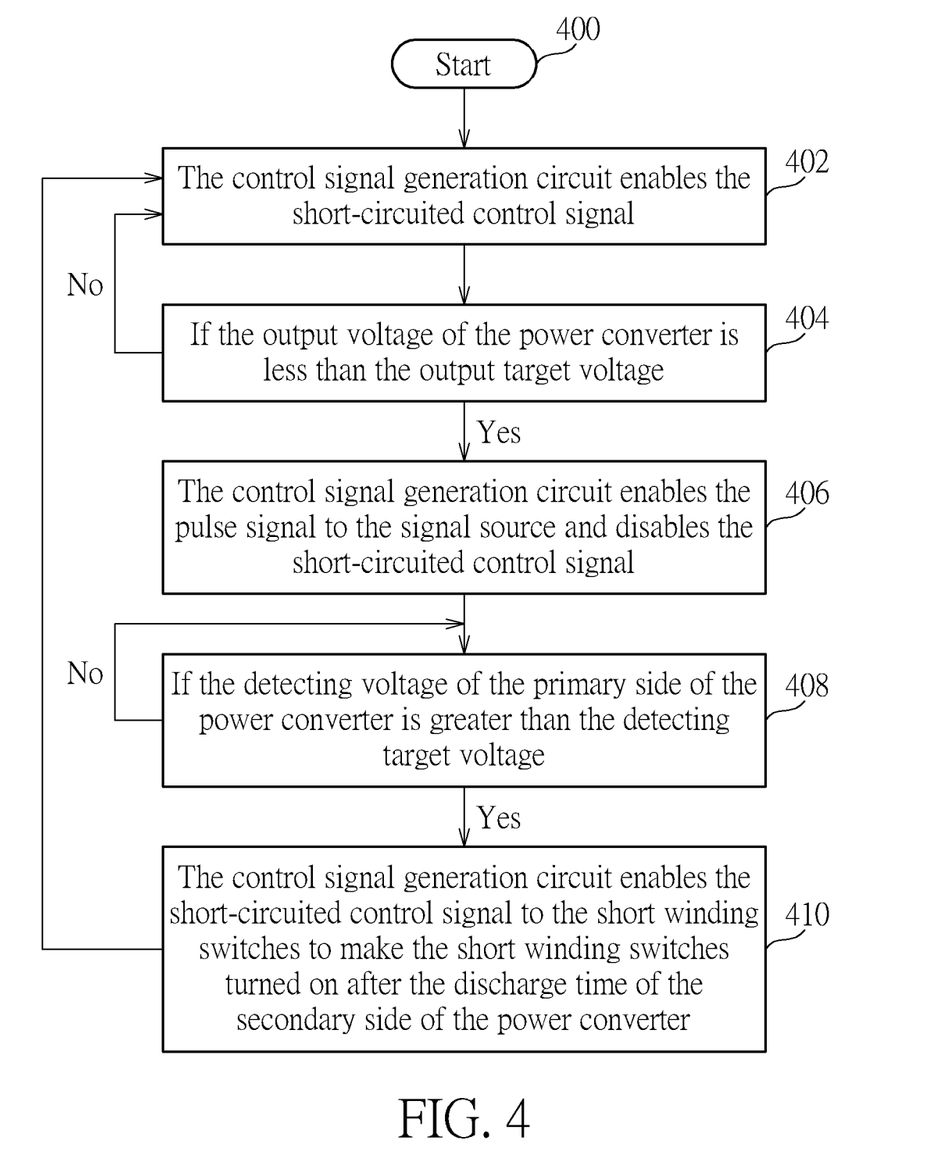
FIG. 4 is a flowchart illustrating an operation method of a secondary controller applied to a secondary side of a power converter according to a second embodiment of the present invention.

Please refer to FIGS. 1, 2, 4. FIG. 4 is a flowchart illustrating an operation method of a secondary controller applied to a secondary side of a power converter according to a second embodiment of the present invention. The operation method in FIG. 4 is illustrated using the power converter 100, the primary controller 114, and the secondary controller 200 in FIG. 1, and the output voltage VOUT, the secondary-side current IS, the turning-on signal TS, the short-circuited control signal SWG, and the voltage VSAUX in FIG. 2. Detailed steps are as follows:

Step 400: Start.

Step 402: The control signal generation circuit 202 enables the short-circuited control signal SWG.

Step 404: If the output voltage VOUT of the power converter 100 is less than the output target voltage VTAR; if yes, go to Step 406; if no, go to Step 402 again.

Step 406: The control signal generation circuit 202 enables the pulse signal PS to the signal source 110 and disables the short-circuited control signal SWG.

Step 408: If the detecting voltage VS of the primary side PRI of the power converter 100 is greater than the detecting target voltage; if yes, go to Step 410; if no, go to Step 408 again.

Step 410: The control signal generation circuit 202 enables the short-circuited control signal SWG to the short winding switches 118, 120 to make the short winding switches 118, 120 turned on after the discharge time TDIS of the secondary side SEC of the power converter 100, go to Step 402.

In Step 402, please refer to FIGS. 1, 2. Before the time T1, the short-circuited control signal SWG is enabled by the control signal generation circuit 202 and the output voltage VOUT is greater than the output target voltage VTAR. In Step 406, at the time T1, because the output voltage VOUT is less than the output target voltage VTAR, the control signal generation circuit 202 can enable the pulse signal PS to the signal source 110 and disable the short-circuited control signal SWG, wherein the signal source 110 can enable the turning-on signal TS according to the pulse signal PS. As shown in FIG. 2, During the enabling period (between the time T1 and the time T2) of the turning-on signal TS, the voltage VSAUX of the secondary-side auxiliary winding 108 can be changed with the turning-on signal TS, and the voltage VSAUX can be coupled to the primary-side auxiliary winding 112 to make the primary-side auxiliary winding 112 generate the voltage VC, wherein the primary controller 114 of the primary side PRI of the power converter 100 can enable the first gate control signal GCS to the power switch 116 to turn on the power switch 116, resulting in the primary side PRI of the power converter 100 being turned on (at the time T2) according to the voltage VC.

In Step 408, please further refer to FIGS. 1, 2. At the time T3, when the detecting voltage VS of the primary side PRI of the power converter 100 is greater than the detecting target voltage, the primary controller 114 can disable the first gate control signal GCS to turn off the power switch 116, resulting in the primary side PRI of the power converter 100 being turned off.

As shown in FIG. 2, after the time interval TON (i.e. the turning-on period of the power switch 116), the control signal generation circuit 202 can determine the discharge time TDIS of the secondary side SEC of the power converter 100 according to the voltage VSAUX, wherein the discharge time TDIS is between the time T4 and the time T5, and meanwhile because the primary side PRI of the power converter 100 is turned off, the secondary side SEC of the power converter 100 starts to discharge (as shown in FIG. 2, the secondary-side current IS starts to be reduced from the maximum value at the time T4). In Step 410, the control signal generation circuit 202 can enable the short-circuited control signal SWG to the short winding switches 118, 120 to make the short winding switches 118, 120 turned on according to the short-circuited control signal SWG after the discharge time TDIS (i.e. the time T6) of the secondary side SEC of the power converter 100, wherein the predetermined time (that is, the time interval existing between the time T5 and the time T6) exists between the discharge time TDIS and the short-circuited control signal SWG, and the predetermined time can be changed with the requirement of the designer of the power converter 100. Meanwhile, because the short winding switches 118, 120 are turned on, the two terminals of the secondary-side auxiliary winding 108 will be shorted. Therefore, as shown in FIG. 2, after the short winding switches 118, 120 are turned on, the voltage VSAUX will not have resonance to ensure that the primary controller 114 does not turn on the primary side PRI of the power converter 100.

In addition, as shown in FIG. 2, at the time T7, because the output voltage VOUT is less than the output target voltage VTAR again, the control signal generation circuit 202 can enable the pulse signal PS to the signal source 110 again. In addition, after the time T7, operational principles of the power converter 100, the primary controller 114, and the secondary controller 200 can be referred to the above-mentioned operational principles of the power converter 100, the primary controller 114, and the secondary controller 200 between the time T1 and the time T6, so further description thereof is omitted for simplicity.

Figure 5:
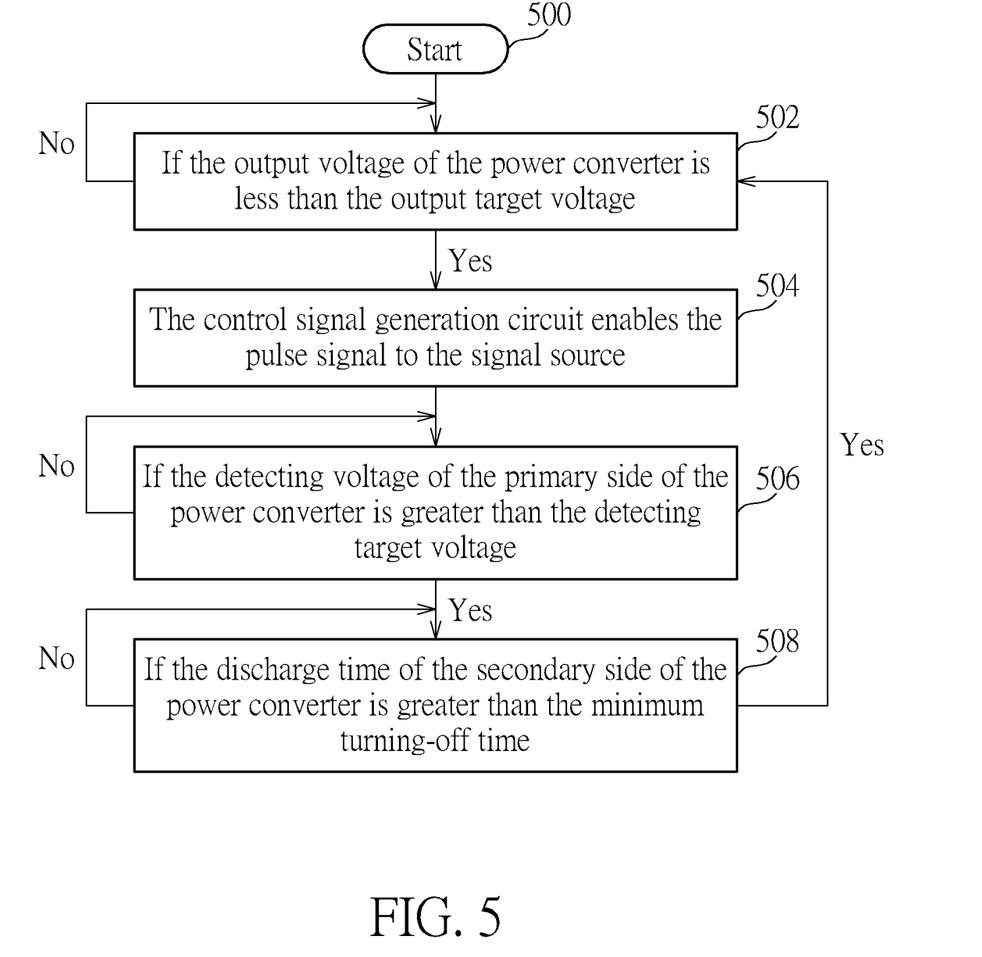
FIG. 5 is a flowchart illustrating an operation method of a secondary controller applied to a secondary side of a power converter according to a third embodiment of the present invention.

Please refer to FIGS. 1, 3, 5. FIG. 5 is a flowchart illustrating an operation method of a secondary controller applied to a secondary side of a power converter according to a third embodiment of the present invention. The operation method in FIG. 5 is illustrated using the power converter 100, the primary controller 114, and the secondary controller 200 in FIG. 1, and the output voltage VOUT, the secondary-side current IS, the turning-on signal TS, the short-circuited control signal SWG, and the voltage VSAUX in FIG. 3. Detailed steps are as follows:

Step 500: Start.

Step 502: If the output voltage VOUT of the power converter 100 is less than the output target voltage VTAR; if yes, go to Step 504; if no, go to Step 502 again.

Step 504: The control signal generation circuit 202 enables the pulse signal PS to the signal source 110.

Step 506: If the detecting voltage VS of the primary side PRI of the power converter 100 is greater than the detecting target voltage; if yes, go to Step 508; if no, go to Step 506 again.

Step 508: If the discharge time TDIS of the secondary side SEC of the power converter 100 is greater than the minimum turning-off time TOFFMIN; if yes, go to Step 502; if no, go to Step 508 again.

Please refer to FIGS. 1, 3. Before the time T1, the short-circuited control signal SWG is enabled by the control signal generation circuit 202 and the output voltage VOUT is greater than the output target voltage VTAR. In Step 504, at the time T1, because the output voltage VOUT is less than the output target voltage VTAR, the control signal generation circuit 202 can enable the pulse signal PS to the signal source 110, wherein the signal source 110 can enable the turning-on signal TS according to the pulse signal PS. In addition, at the time T1, because the output voltage VOUT is less than the output target voltage VTAR, the control signal generation circuit 202 can further disable the short-circuited control signal SWG. During the enabling period (between the time T1 and the time T2) of the turning-on signal TS, the voltage VSAUX of the secondary-side auxiliary winding 108 of the power converter 100 can be changed with the turning-on signal TS, and the voltage VSAUX can be coupled to the primary-side auxiliary winding 112 of the power converter 100 to make the primary-side auxiliary winding 112 generate the voltage VC, wherein the primary controller 114 of the primary side PRI of the power converter 100 can enable the first gate control signal GCS to the power switch 116 of the primary side PRI of the power converter 100 according to the voltage VC to turn on the power switch 116, resulting in the primary side PRI of the power converter 100 being turned on (at the time T2).

In Step 506, please further refer to FIGS. 1, 3. At the time T3, when the detecting voltage VS of the primary side PRI of the power converter 100 is greater than the detecting target voltage, the primary controller 114 can disable the first gate control signal GCS to turn off the power switch 116, resulting in the primary side PRI of the power converter 100 being turned off.

In Step 508, as shown in FIG. 3, after the time interval TON (i.e. the turning-on period of the power switch 116), the control signal generation circuit 202 can enable the turning-on signal TS at the time T4 according to the minimum turning-off time TOFFMIN, wherein because the power converter 100 operates in the continuous conduction mode, the secondary-side current IS is not reduced to zero at the time T4, and the minimum turning-off time TOFFMIN corresponds to the maximum operating frequency of the power converter 100. In addition, as shown in FIG. 3, before the control signal generation circuit 202 enables the turning-on signal TS at the time T4, the output voltage VOUT starts to be less than the output target voltage VTAR at the time T5. In addition, as shown in FIG. 3, after the time T4, operational principles of the power converter 100, the primary controller 114, and the secondary controller 200 can be referred to the above-mentioned operational principles of the power converter 100, the primary controller 114, and the secondary controller 200 between the time T1 and the time T4, so further description thereof is omitted for simplicity.

To sum up, the secondary controller applied to the secondary side of the power converter and the operation method thereof utilize the secondary-side auxiliary winding to couple the turning-on signal enabled by the signal source to the primary-side auxiliary winding to make the primary controller turn on the power converter according to voltage change of the primary-side auxiliary winding. Therefore, compared to the prior art, because the secondary controller can control turning-on of the power converter not through a feedback path formed by a photo coupler and a secondary-side synchronous rectification switch, the power converter of the present invention has lower cost and quickly dynamic response to change of the output voltage of the secondary side of the power converter. In addition, because the secondary controller can control turning-on of the power converter through the secondary-side auxiliary winding and the turning-on signal, the power converter not only can operate in the discontinuous conduction mode (or the quasi resonant mode), but can also operate in the continuous conduction mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A secondary controller applied to a secondary side of a power converter, the secondary controller comprising:
a control signal generation circuit coupled to an output terminal of the secondary side of the power converter for detecting an output voltage of the secondary side, enabling a pulse signal to a signal source of the secondary side of the power converter, and enabling a short-circuited control signal to at least one short winding switch after a discharge time of the secondary side of the power converter to make the at least one short winding switch turned on, wherein the signal source enables a turning-on signal according to the pulse signal, and when the output voltage is less than an output target voltage, the control signal generation circuit enables the pulse signal to the signal source, and disables the short-circuited control signal;
wherein the turning-on signal is coupled to a primary-side auxiliary winding of the power converter through a secondary-side auxiliary winding of the power converter to make the primary-side auxiliary winding generate a voltage, and a primary controller of a primary side of the power converter makes the primary side of the power converter turned on according to the voltage generated by the primary-side auxiliary winding.

2. The secondary controller of claim 1, wherein the power converter is a flyback power converter.

3. The secondary controller of claim 1, wherein the signal source is a voltage source or a current source.

4. The secondary controller of claim 1, wherein the at least one short winding switch is coupled to the secondary-side auxiliary winding.

5. The secondary controller of claim 1, wherein the power converter operates in a discontinuous conduction mode (DCM).

6. The secondary controller of claim 1, wherein a predetermined time exists between the discharge time and the short-circuited control signal.

7. The secondary controller of claim 1, wherein during a turning-on period of the primary side of the power converter, when a detecting voltage of the primary side of the power converter is greater than a detecting target voltage, the primary controller turns off the primary side of the power converter.

8. A secondary controller applied to a secondary side of a power converter, the secondary controller comprising:
a control signal generation circuit coupled to an output terminal of the secondary side of the power converter for detecting an output voltage of the secondary side and enabling a pulse signal to a signal source of the secondary side of the power converter, wherein the signal source enables a turning-on signal according to the pulse signal;

wherein the turning-on signal is coupled to a primary-side auxiliary winding of the power converter through a secondary-side auxiliary winding of the power converter to make the primary-side auxiliary winding generate a voltage, and a primary controller of a primary side of the power converter makes the primary side of the power converter turned on according to the voltage;

wherein when a discharge time of the secondary side of the power converter is greater than a minimum turning-off time and the output voltage is less than an output target voltage, the control signal generation circuit enables the pulse signal to the signal source.

9. The secondary controller of claim 8, wherein the power converter operates in a continuous conduction mode (CCM).

10. The secondary controller of claim 8, wherein during a turning-on period of the primary side of the power converter, when a detecting voltage of the primary side of the power converter is greater than a detecting target voltage, the primary controller turns off the primary side of the power converter.

11. An operation method of a secondary controller applied to a secondary side of a power converter, the secondary controller comprising a control signal generation circuit, the operation method comprising:

the control signal generation circuit enabling a pulse signal to a signal source of the secondary side of the power converter and disabling a short-circuited control signal when an output voltage of the secondary side of the power converter is less than an output target voltage, wherein the signal source enables a turning-on signal according to the pulse signal, the turning-on signal is coupled to a primary-side auxiliary winding of the power converter through a secondary-side auxiliary winding of the power converter to make the primary-side auxiliary winding generate a voltage, and a primary controller of a primary side of the power converter makes the primary side of the power converter turned on according to the voltage generated by the primary-side auxiliary winding;

during a turning-on period of the primary side of the power converter, when a detecting voltage of the primary side of the power converter is greater than a detecting target voltage, the primary controller turning off the primary side of the power converter; and the control signal generation circuit enabling a short-circuited control signal to at least one short winding switch after a discharge time of the secondary side of the power converter to make the at least one short winding switch turned on.

12. The operation method of claim 11, wherein after the at least one short winding switch is turned on, when the output voltage is less than the output target voltage again, the control signal generation circuit enables the pulse signal to the signal source again, and disables the short-circuited control signal again.

13. The operation method of claim 11, wherein a predetermined time exists between the discharge time and the short-circuited control signal.

14. An operation method of a secondary controller applied to a secondary side of a power converter, the secondary controller comprising a control signal generation circuit, the operation method comprising:

the control signal generation circuit enabling a pulse signal to a signal source of the secondary side of the power converter when a discharge time of the secondary side of the power converter is greater than a minimum turning-off time and an output voltage of the secondary side of the power converter is less than an output target voltage, wherein the signal source enables a turning-on signal according to the pulse signal, the turning-on signal is coupled to a primary-side auxiliary winding of the power converter through a secondary-side auxiliary winding of the power converter to make the primary-side auxiliary winding generate a voltage, and a primary controller of a primary side of the power converter makes the primary side of the power converter turned on according to the voltage; and during a turning-on period of the primary side of the power converter, when a detecting voltage of the primary side of the power converter is greater than a detecting target voltage, the primary controller turns off the primary side of the power converter.

15. The operation method of claim 14, wherein after the primary side of the power converter is turned off, when the discharge time is greater than the minimum turning-off time again and the output voltage is less than the output target voltage again, the control signal generation circuit enables the pulse signal to the signal source again.

\* \* \* \* \*